(12) United States Patent
Yoon

(10) Patent No.: US 7,244,068 B2
(45) Date of Patent: Jul. 17, 2007

(54) BI-DIRECTIONAL OPTICAL MODULES PACKAGE

(76) Inventor: Hyun-Jae Yoon, 206-802, Kumho Apartment Bongsun2-Dong, Nam-Gu, Gwangju (KR) 503-062

( * ) Notice: Subject to any disclaimer, the term of this patent is extended or adjusted under 35 U.S.C. 154(b) by 0 days.

(21) Appl. No.: 10/566,290

(22) PCT Filed: Jul. 28, 2004

(86) PCT No.: PCT/KR2004/001909

§ 371 (c)(1),
(2), (4) Date: Jan. 27, 2006

(87) PCT Pub. No.: WO2005/010588

PCT Pub. Date: Feb. 3, 2005

(65) Prior Publication Data

US 2006/0239623 A1    Oct. 26, 2006

(30) Foreign Application Priority Data

Jul. 29, 2003    (KR) .................. 10-2003-0052325

(51) Int. Cl.
*G02B 6/36* (2006.01)

(52) U.S. Cl. .................. 385/93; 385/53; 385/88; 385/92

(58) Field of Classification Search .................. 385/93
See application file for complete search history.

(56) References Cited

U.S. PATENT DOCUMENTS

| 5,408,559 | A  | * | 4/1995 | Takahashi et al. ............ 385/89 |
| 6,985,647 | B2 | * | 1/2006 | Takamori .................. 385/14 |
| 2004/0184744 | A1 | * | 9/2004 | Uekawa .................. 385/93 |

* cited by examiner

*Primary Examiner*—Jennifer Doan
(74) *Attorney, Agent, or Firm*—Mitchell P. Brook, Esq.; Luce, Forward, Hamilton & Scripps LLP

(57) ABSTRACT

Provided is a bi-directional optical module package having an optical module unit comprising a substrate member, an optical filter installed on the substrate member to be inclined with respect to an optical fiber, a first holder supported by the substrate member on one side of the optical filter and having a laser diode and a lens for transmitting an optical signal to the optical fiber through one side of the optical filter, and a second holder supported by the substrate member on the other side of the optical filter and having a photodiode and a lens for receiving the optical signal received through the optical fiber through the optical filter.

6 Claims, 4 Drawing Sheets

BI-DIRECTIONAL OPTICAL MODULES PACKAGE

TECHNICAL FIELD

The present invention relates to an optical module, and more particularly, to a bi-directional optical module package which simultaneously transceives optical signals having different wavelengths through a single optical fiber.

BACKGROUND ART

An optical communication network for exchanging information at low cost, like a Fiber to the Home (FTTH) or a computer network using light, has a single optical fiber distribution network which connects between a center office or a host and, an individual subscriber or terminal through a single-strand optical fiber, which is one way of reducing an installation cost of optical fibers. Wavelength division multiplexing (WDM) in which a wavelength of signal light is divided prior to use is employed to simultaneously transceive information through the single optical fiber distribution network.

An optical module has been manufactured such that a laser diode (to be abbreviated as LC hereinafter) module and a photodiode (to be abbreviated as PD hereinafter) module are separately fabricated and incorporated into the optical module. In recent years, however, the FTTH or the computer optical network having an advantageous feature of cost effectiveness has gained popularity. Accordingly, there has been rapidly increasing demand for a bi-directional optical module capable of simultaneously transceiving an optical signal through a single-strand optical fiber. Such a conventional bi-directional optical module, as shown in FIG. 1, has been assembled such that a top open (TO) type LD module 1 and a TO type PD module 2 are simply combined with each other around an optical filter 3.

In the above-described bi-directional optical module, that is, a simply assembled package of TO type LD and PD modules, the TO type LD module and the TO type PD module are separately used, so that the module package becomes bulky, making it difficult to achieve miniaturization. Thus, it is quite difficult for the bi-directional optical module to satisfy the Small Form Factor Pluggable Transceiver Multi-Source Agreement (SMF MSA) which has been recently internationally standard. In addition, a distance between the LD and PD modules increases, e.g., 10 mm or more, optical axes of the LD and PD modules may often be misaligned due to cumulative errors, including a precision error metal blocks supporting the LD and PD modules, errors in positions in a lens, an optical filter, and the like, much time is required for optical alignment, and inferiority in the reception sensitivity may become relatively severe.

Meanwhile, since the bi-directional optical module is configured such that the LD and PD modules, the lens, the optical filter, and other elements are fixed on a metal member, thermal expansion of the metal member depending on a change in the temperature may considerably affect the operation of the bi-directional optical module, for example, a great change in the optical path. A bi-directional optical module having a thermal expansion problem is quite difficult to meet an optical output requirement that a change in the optical output be within ±1 dB operating temperature range, generally −40 to 85° C.

Korean Patent Registration No. 10-0289040 discloses a bi-directional optical communication module using a single optical fiber. In the disclosed bi-directional optical communication module, a bi-directional optical device including a semiconductor laser having a waveguide and a light receiving element is integrated on a single chip and the bi-directional optical device is optically coupled to a single optical fiber. When the optical fiber is optically coupled to the semiconductor laser and the light receiving element, transmission light emitted from the semiconductor laser is optically coupled to a core of the optical fiber and a cross section of the optical fiber is ground to form an acute angle with respect to the optical fiber to allow reception light emitted from the core of the optical fiber to concentrate on a light receiving area of the bi-directional optical device for optical coupling.

One way to prevent an assembling failure of the existing bi-directional optical communication module is to integrate a semiconductor laser and a light receiving element on a single chip, which, however, results in a deterioration of a light focusing power, making it difficult to achieve transceiving of the light.

Korean Patent Publication No. 2003-0032774 discloses a bi-directional optical module having an optical transmitting function through a single optical fiber. The disclosed bi-directional optical module is configured such that a light receiving block, an LD block and a double-sided m-PD block are fixedly installed on equipment in which of a light source, an optical filter and a lens are assembled. The use of the assembling equipment reduces the number of optical components of the bi-directional optical module and the number of processes for performing laser welding. However, it is quite difficult to achieve miniaturization of the bi-directional optical module.

DISCLOSURE OF THE INVENTION

Figure 1:
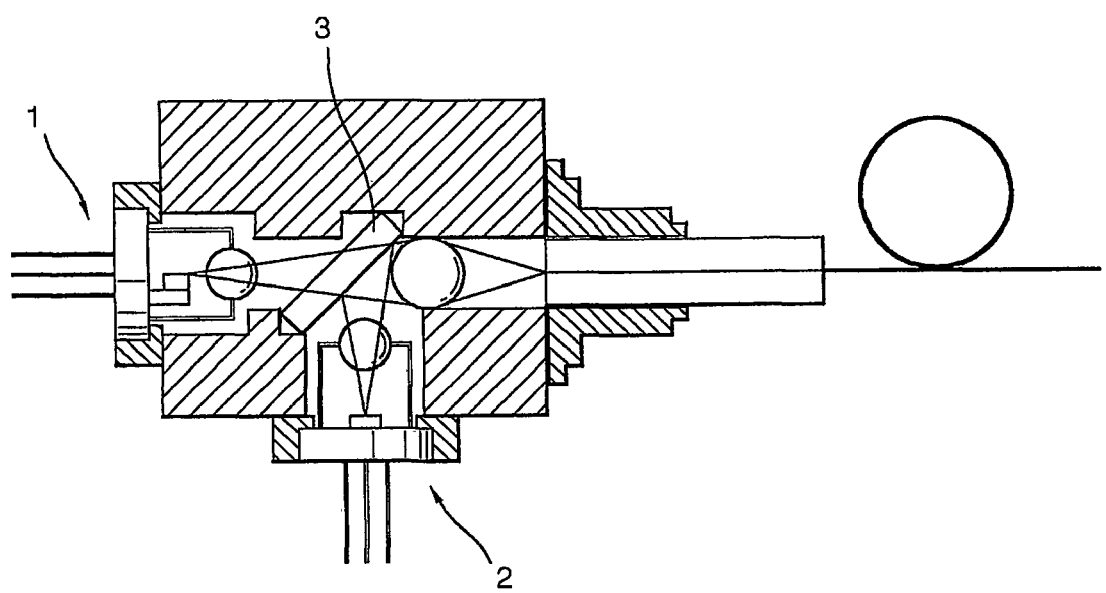
FIG. 1 is a cross-sectional view showing a conventional bi-directional optical module package.

To solve the above problems, it is an object of the present invention to provide a bi-directional optical module package which enables miniaturization and improves an optical axis alignment and focusing characteristics.

It is another object of the present invention to provide a bi-directional optical module package which is minimally influenced by thermal expansion and thermal shrinkage by mounting various optical components on a ceramic substrate, and which enables a high-speed operation of 10 Gbps or more by improving an operation characteristic of an ultrahigh frequency.

It is still another object of the present invention to provide an integrated bi-directional optical module package by forming a circuit pattern for impedance matching and a bonding pad on a sub-mount itself.

To accomplish the above objects of the present invention, there is provided a bi-directional optical module package having an optical module unit comprising a substrate member, an optical filter installed on the substrate member to be inclined with respect to an optical fiber, a first holder supported by the substrate member on one side of the optical filter and having a laser diode and a lens for transmitting an optical signal to the optical fiber through one side of the optical filter, and a second holder supported by the substrate member on the other side of the optical filter and having a photodiode and a lens for receiving the optical signal received through the optical fiber.

According to a feature of the present invention, the substrate member and the first and second holders are made of ceramic. Also, an optical axis of light transmitted from the laser diode and an optical axis of light received from the photodiode are disposed at right angle with respect to each other with the optical filter being interposed therebetween.

The first holder may include a first base portion having a laser diode, a pad and a circuit pattern installed thereon, and first extending portions which extend from both sides of the first base portion to define a fixed position of the lens, and the second holder includes a second base portion having a photodiode installed on an inner surface thereof, and second extending portions which extend from both sides of the second base portion to define a fixed position of the lens.

According to another aspect of the present invention, there is provided a bi-directional optical module package comprising an optical fiber which is supported by supporting means, an optical module unit which has a substrate member, an optical filter, a first holder, and a second holder, the optical filter being installed on the substrate member to be inclined with respect to the optical fiber, the first holder being supported by the substrate member on one side of the optical filter and having a laser diode and a lens for transmitting an optical signal to the optical fiber through one side of the optical filter, and the second holder being supported by the substrate member on the other side of the optical filter and having a photodiode and a lens for receiving the optical signal received through the optical fiber, a stem which supports the optical module unit and has a plurality of pins, and a cover member which is coupled to the stem to surround the optical module unit, and has an opening formed on a side corresponding to the optical fiber.

The bi-directional optical module package may further comprise an auxiliary lens for focusing light in the opening of the cover member.

BEST MODE FOR CARRYING OUT THE INVENTION

Figure 2:
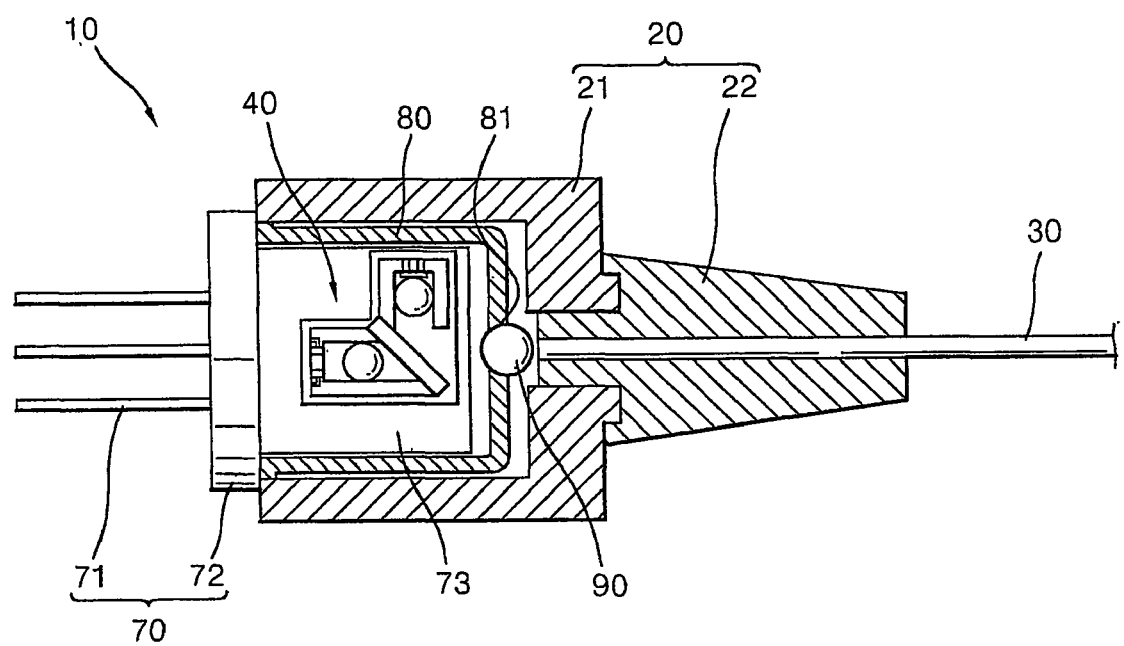
FIG. 2 is a cross-sectional view showing a bi-directional optical module package according to the present invention.
Figure 3:
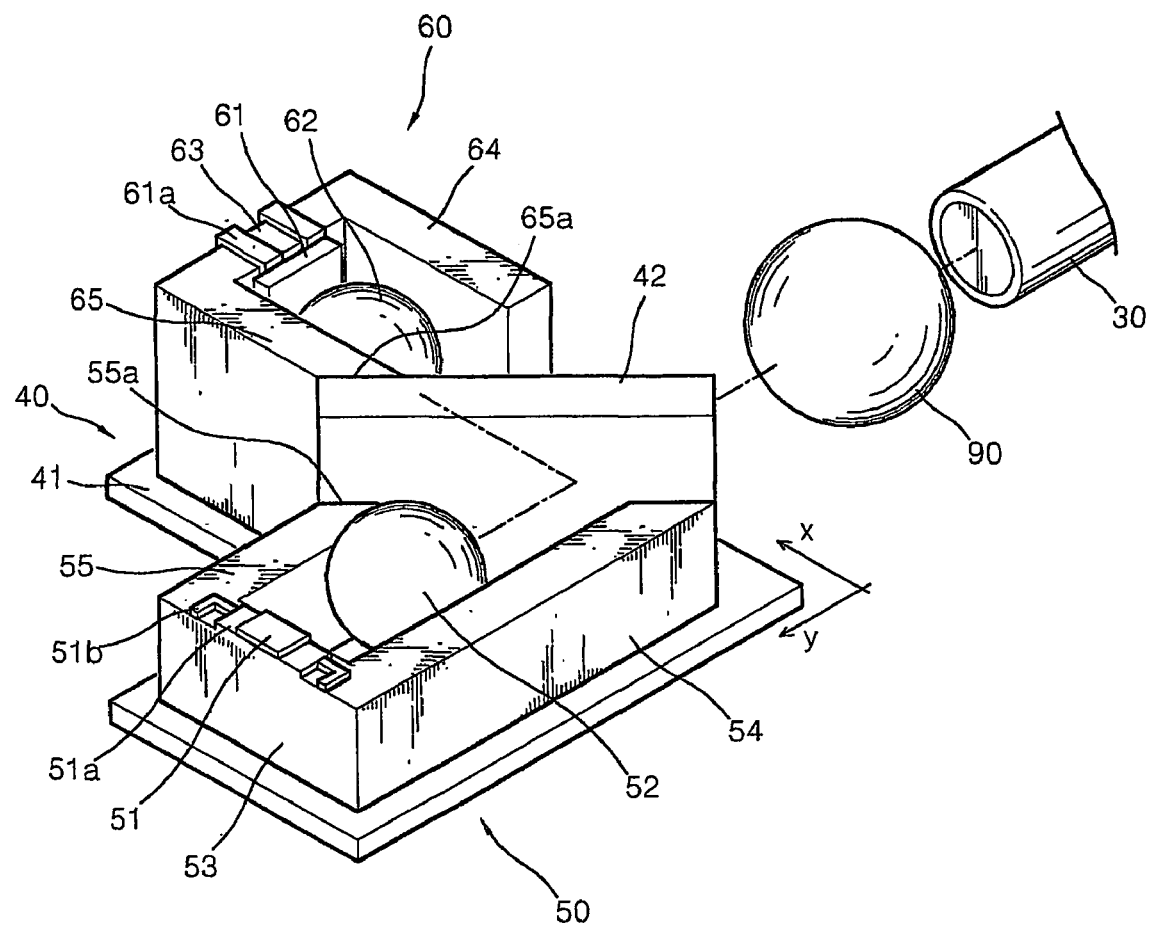
FIG. 3 is a perspective view showing an optical module unit according to the present invention.

A bi-directional optical module package according to the present invention uses wavelength division multiplexing (WDM), in which a wavelength of signal light is divided prior to use to simultaneously transceive information through a single optical fiber distribution network, which is shown in FIGS. 2 and 3.

Referring to the drawings, a bi-directional optical module package 10 includes an optical fiber 30 supported by supporting means 20; an optical module unit 40 for transceiving an optical signal through the optical fiber 30; a stem 70 which supports the optical module unit 40 and has a plurality of pins 71; and a cover member 80 which is coupled to the stem 70, surrounds the optical module unit 40, and has an opening 81 formed on a side corresponding to the optical fiber 30, the opening 81 having a lens 90.

The above-described bi-directional optical module package 10 according to the present invention will now be explained more detail by component.

As shown in FIGS. 2 and 3, the optical module unit 40 is supported on the stem 70. The optical module unit 40 has a substrate member 41 of a plate shape having a predetermined thickness and an optical filter 42 installed on the substrate member 41 to be inclined with respect to the optical fiber 30. The substrate member 41 has an L-shape, but not limited thereto. The optical filter 42 is installed at an inclination angle of substantially 45° on the substrate member 41. A first holder 50 is installed on the substrate member 41 on which the optical filter 42 is installed along one side of the substrate member 41, that is, in the Y-axis direction. The first holder 50 includes a laser diode 51 and a first micro ball lens 52 for focusing an optical signal irradiated from the laser diode 51 on the optical fiber 30. The first holder 50 has a first base portion 53 and first extending portions 54 and 55 extending from both sides of the first base portion 53 to the optical filter 42 by a predetermined length. The laser diode 51 is installed on an upper surface of the first base portion 53 and a circuit pattern 51a for driving the laser diode 51 and a bonding pad 51b are installed on a side adjacent to the laser diode 51. Here, the heights of the first extending portions 54 and 55 defining a position of the first micro ball lens 52 are preferably set to irradiate light irradiated from the laser diode 51 on a central axis of the first micro ball lens 52. Also, it is preferable that the diameter of the first micro ball lens 52 is longer than a distance between the first extending portions 54 and 55 so that the first micro ball lens 52 is placed on the first extending portions 54 and 55.

Meanwhile, a second holder 60 is installed on the substrate member 41 along the other side (X-axis direction) of the substrate member 41 on which the optical filter 42 is installed.

A photodiode 61 for receiving an optical signal received from the optical fiber 30 and a second micro ball lens 62 for focusing reception light incident from the optical fiber 30 on the photodiode 61 are installed on the second holder 60. The second holder 60 includes a second base portion 63 and second extending portions 64 and 65 extending from both sides of the second base portion 63 to the optical filter 42 by a predetermined length. The photodiode 61 is installed in an inner surface of the second base portion 63 corresponding to the optical filter 42 and a wire-bonding pad 61a for extracting a signal from the photodiode 61 is formed in an upper surface of the second base portion 63. Here, it is preferable that a distance between the second extending portions 64 and 65 is the substantially same as the diameter of the second micro ball lens 62 so that a position of the second micro ball lens 62 is fixed by the second extending portions 64 and 65. The first and second holders 50 and 60 are arranged to make at substantially right angles to each other with the optical filter 42 being interposed therebetween. It is preferable that inclined planes 55a and 65a having the same gradient as that of an external surface of the optical filter 42 are formed in end portions of the first and second extending portions 55 and 65 touched to the optical filter 42 so that a mounting position of the optical, filter 42 is defined.

The substrate member 41 and the first and second holders 50 and 60 are preferably formed of a material having a relatively low thermal expansion coefficient, such as aluminum nitride, ceramic, or the like, but not limited thereto. Any material having a relatively low thermal expansion coefficient can be used as materials for the substrate member 41 and the first and second holders 50 and 60.

As shown in FIGS. 2 and 3, the stem 70 may further have a base 72, in which the plurality of pins 71 are installed, and a base substrate 73 extending from the base 72 and supporting the optical module unit 40. The plurality of pins 71 are wire-bonded to the pads 51b and 61a of the laser diode 51 and the photodiode 61 so that plurality of pins 71 are electrically connected to the laser diode 51 and the photodiode 61.

The cover member 80 is coupled to the base 72 of the stem 70 to surround the optical module unit 40. An opening 81 is formed in an area corresponding to the cover member 80, the area being positioned between the optical filter 41 and the optical fiber 30, and the lens 90 for focusing the signal light is installed in the opening 81.

The supporting means 20 is provided for aligning the optical module unit 40 surrounded by the stem 70 and the cover member 80 with the optical fiber 30. The supporting means 20 includes a housing 21 supporting the optical module unit 40 surrounded by the stem 70 and the cover member 80; and a holder 22 which is coupled to the housing 21, supports the optical fiber 30, and aligns the lens 90 supported by the cover member 80 and the optical fiber 30.

Figure 4:
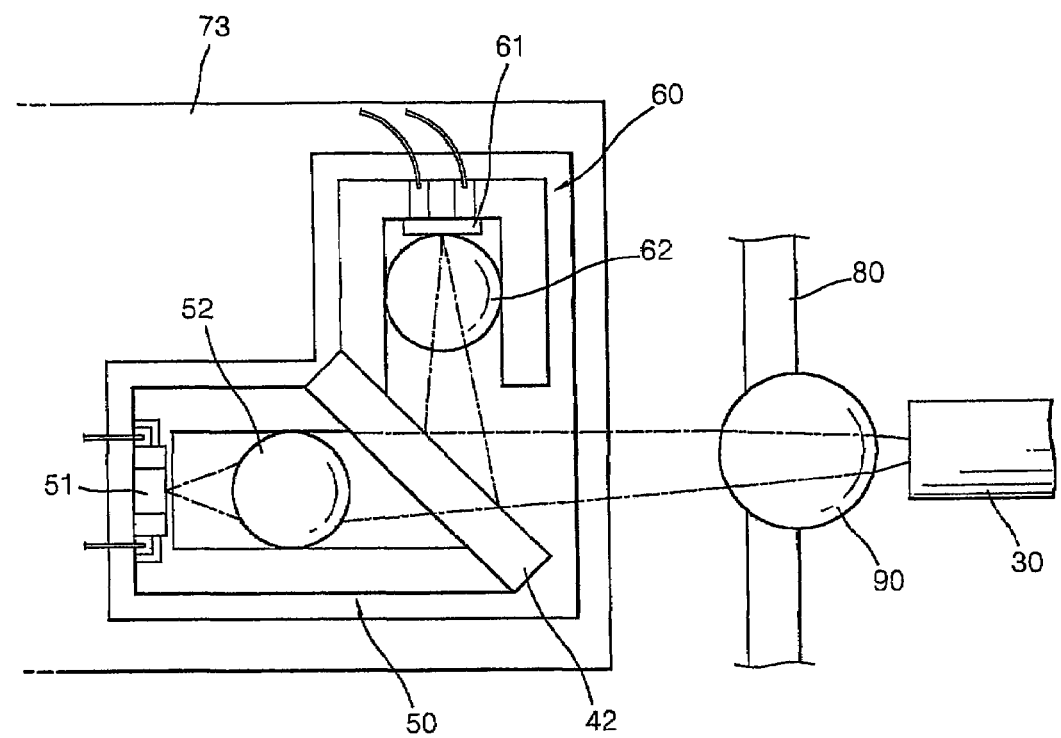
FIG. 4 is a schematic cross-sectional view showing transceiving operations of an optical signal in the bi-directional optical module package.

As shown in FIG. 4, in the bi-directional optical module package 10 having the above-described configuration, transmission light output from the laser diode 51 is focused by the first micro ball lens 52 to then pass through the optical filter 42, and is then focused on an end portion of the optical fiber 30 by the lens 90 supported by the cover member 80. Reception light incident from the optical fiber 30 is focused by the lens 90 so that the reception light is focused on a small area of a surface of the optical filter 42 and is then reflected. The reflected reception light is focused by the second micro ball lens 62 and then is focused on the photodiode 61.

As described above, a bi-directional optical module package according to the present invention has the following effects.

First, first and second holders supporting a laser diode, a photodiode, first and second micro ball lens and a substrate member are made of a ceramic material whose a thermal expansion coefficient is relatively low so that a change in a position according to thermal expansion is minimized, thereby making it possible to reduce a change in input and output of light.

Second, since the laser diode for transmitting light and the photodiode for receiving the light are installed on the first and second holders and an optical filter is fixed between the first and second holders, the size of the optical filter can be reduced (within 2×2×1 (mm)), thereby manufacturing optical modules that meet international standard requirements. Also, since a distance between the laser diode and the photodiode is short, a manual alignment method by mechanical tolerance can be used and the number of operations required in the manual alignment method can be reduced.

Third, a circuit pattern for impedance matching and a wire-bonding pad can be installed on the holders made of ceramic, thereby manufacturing the integrated bi-directional optical module package.

While the present invention has been particularly shown and described with reference to exemplary embodiments thereof, it will be understood by those of ordinary skill in the art that various changes in form and details may be made therein without departing from the spirit and scope of the present invention as defined by the following claims. The scope of the invention is, therefore, indicated by the appended claims rather than by the foregoing description.

The invention claimed is:

1. A bi-directional optical module package having an optical module unit comprising:
    a substrate member;
    an optical filter installed on the substrate member to be inclined with respect to an optical fiber;
    a first holder supported by the substrate member on one side of the optical filter and having a laser diode and a lens for transmitting an optical signal to the optical fiber through one side of the optical filter; and
    a second holder supported by the substrate member on the other side of the optical filter and having a photodiode and a lens for receiving the optical signal received through the optical fiber,
    wherein the first holder includes a first base portion having a laser diode, a pad and a circuit pattern installed thereon, and first extending portions which extend from both sides of the first base portion to define a fixed position of the lens, and the second holder includes a second base portion having a photodiode installed on an inner surface thereof and a wire bonding pad installed thereon, and second extending portions which extend from both sides of the second base portion to define a fixed position of the lens, and
    wherein inclined planes having the same gradient as that of an external surface of the optical filter are formed on at least one end portions of the first extending portions and at least one end portions of the second extending portions so that the optical filter is disposed between the inclined planes.

2. The bi-directional optical module package of claim 1, wherein the substrate member and the first and second holders are made of ceramic.

3. The bi-directional optical module package of claim 1, wherein an optical axis of light transmitted from the laser diode and an optical axis of light received from the photodiode are disposed at right angle with respect to each other with the optical filter being interposed therebetween.

4. A bi-directional optical module package comprising:
    an optical fiber which is supported by supporting means;
    an optical module unit which has a substrate member, an optical filter, a first holder, and a second holder, the optical filter being installed on the substrate member to be inclined with respect to the optical fiber, the first holder being supported by the substrate member on one side of the optical filter and having a laser diode and a lens for transmitting an optical signal to the optical fiber through one side of the optical filter, and the second holder being supported by the substrate member on the other side of the optical filter and having a photodiode and a lens for receiving the optical signal received through the optical fiber;
    a stem which supports the optical module unit and has a plurality of pins, and
    a cover member which is coupled to the stem to surround the optical module unit, and has an opening formed on a side corresponding to the optical fiber,
    wherein the first holder includes a first base portion having a laser diode, a pad and a circuit pattern installed thereon, and first extending portions which extend from both sides of the first base portion to define a fixed position of the lens, and the second holder includes a second base portion having a photodiode installed on an inner surface thereof and a wire bonding pad installed thereon, and second extending portions which extend from both sides of the second base portion to define a fixed position of the lens, and
    wherein inclined planes having the same gradient as that of an external surface of the optical filter are formed on at least one end portions of the first extending portions and at least one end portions of the second extending portions so that the optical filter is disposed between the inclined planes.

5. The bi-directional optical module package of claim 4, further comprising an auxiliary lens for focusing light in the opening of the cover member.

6. The bi-directional optical module package of claim 4, wherein the substrate member and the first and second holders are made of ceramic.

* * * * *